United States Patent [19]

Dilcox

[11] Patent Number: 4,516,329

[45] Date of Patent: May 14, 1985

[54] ELECTRONIC LEVEL DEVICE

[76] Inventor: Warren L. Dilcox, 6130 Via Casitas Ave., Carmichael, Calif. 95608

[21] Appl. No.: 528,805

[22] Filed: Sep. 2, 1983

[51] Int. Cl.[3] .................... G01C 9/06

[52] U.S. Cl. .................... 33/366; 33/334; 340/689

[58] Field of Search .................... 33/366, 334; 340/689, 340/854

[56] References Cited

U.S. PATENT DOCUMENTS

| | | | |
|---|---|---|---|
| 2,600,363 | 6/1952 | Morris | 33/366 X |
| 3,204,233 | 8/1965 | Olliff | 340/689 |
| 3,861,052 | 1/1975 | Siegfried | 33/366 |
| 4,079,521 | 3/1978 | Uhorczak | 33/366 |
| 4,167,733 | 9/1979 | Krause et al. | 340/689 X |
| 4,182,046 | 1/1980 | Ludlow et al. | 33/366 |

*Primary Examiner*—William D. Martin, Jr.
*Attorney, Agent, or Firm*—Paul L. Hickman

[57] ABSTRACT

An electronic level device characterized by an enclosure, a knob and shaft rotatably coupled to the enclosure, and a mercury switch located within the enclosure and attached to an end portion of the shaft. The mercury switch is closed when it is in a gravitationally normal position, and is open when it is tilted from the gravitational norm by more than a predetermined amount. By rotating the knob, the angle at which the mercury switch closes can be varied. An audible alarm is actuated by the closure of the mercury switch.

3 Claims, 8 Drawing Figures

FIG. 4a
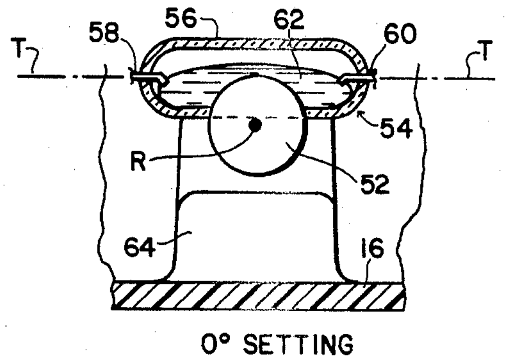
FIG. 4b
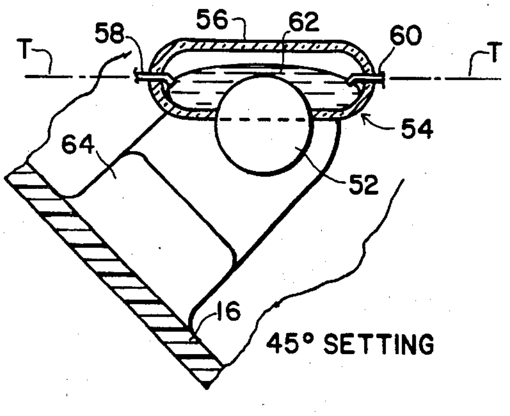
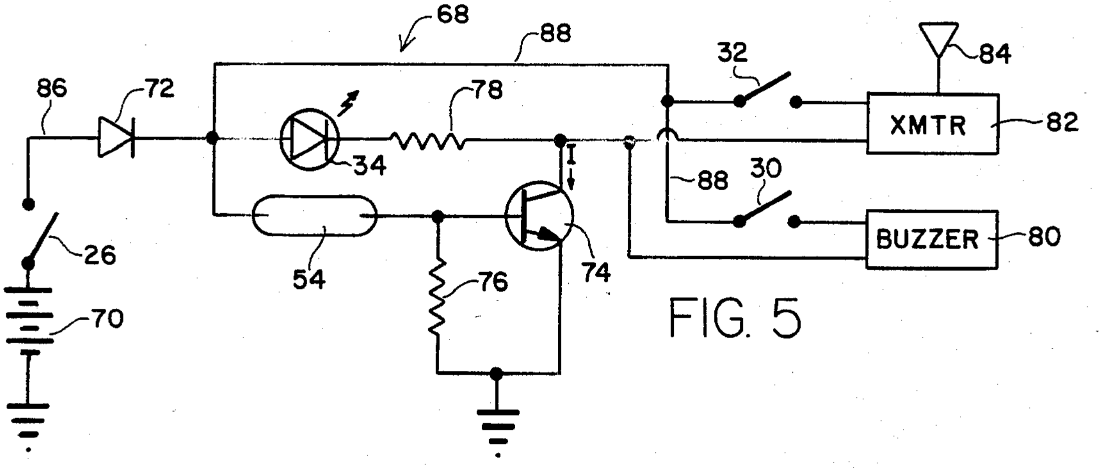
FIG. 5
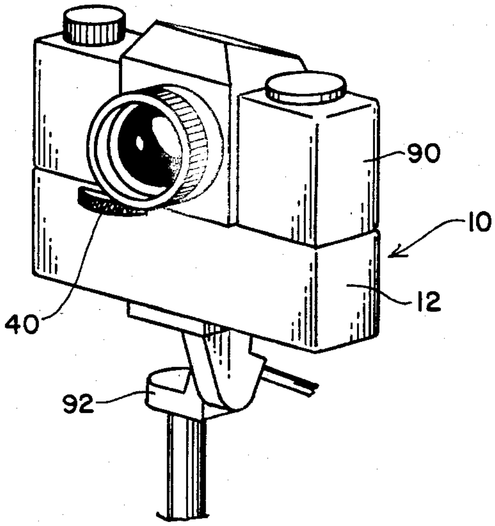
FIG. 6
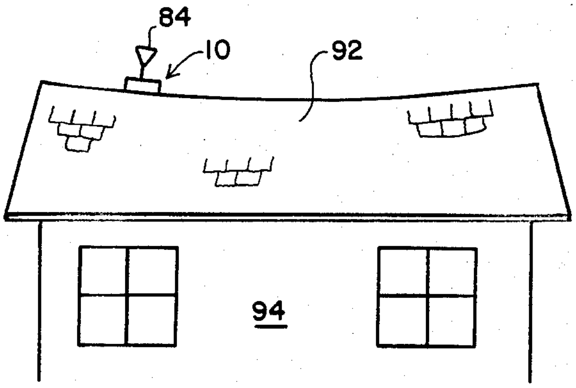
FIG. 7

ELECTRONIC LEVEL DEVICE

BACKGROUND OF THE INVENTION

1. Field of the Invention

This invention relates generally to levels and more particularly to electronic level devices.

2. Description of the Prior Art

When it is desired to level an object, or a surface on that object, a level device is often employed. A common type of level device includes an elongated, rectangular frame supporting one or more bubble levels. Bubble type levels are economical and can be quite accurate, but require that the user be in such a Position that be can view the bubble level. This is disadvantageous is situations where the surface to be leveled is visually inaccessible to the user, or in situations where the user is otherwise visually occupied.

One such situation is during the process of picture taking. A photographer often desires to hold his camera absolutely level or at a specific angle so that the picture he is taking is properly aligned. In the past, tripod mounted bubble levels have been used to ensure that the camera was absolutely level. Such levels are inconvenient, however, and the tripods themselves tend to be unwieldly. For these reasons, many photographers desire a more convenient method for leveling their cameras.

SUMMARY OF THE INVENTION

An object of this invention to provide a level device can provide an audible signal when an object is at a desired angular setting.

Another object of this invention is to provide a level device which can be used to indicate when a hand-held camera is level.

Yet another object of this invention is to provide a level device which can indicate when a remote object is level.

Briefly, the level device includes a substantially rectangular, box shaped enclosure, a rotary shaft extending through a front wall of the enclosure, an elongated mercury switch located within the enclosure and attached to an end of the shaft, and an audible alarm activated by the closure of the mercury switch. The rotary shaft is turned with a knob which can point to angled calibrations provided on the enclosure. The mercury switch, which has a tilt axis perpendicular to the axis of rotation of the shaft, is closed when it is substantially gravitationally normal and is open when it deviates from the gravitational norm by more than a predetermined amount.

The audible alarm is preferably a buzzer, but may additionally be a suitable oscillator circuit and a small speaker. Preferably, a LED is also provided to indicate when the device is at the desired angle. One embodiment of this invention also includes a transmitter to signal a user when a remote object is at a desired angle. The enclosure can be provided with a camera mount on its upper surface and a tripod mount on its lower surface so that it can be used by photographers.

An advantage of this invention is that a user can tell when an object is level without looking at the device.

Another advantage of this invention is that the device can be adjusted so that an audible signal will be given at any desired angular position.

Yet another object of this invention is that the device can be used to indicate when a object is level even when the user is located some distance away.

A still further advantage of this invention is that the enclosure is particularly adapted to level a hand-held or tripod mounted camera.

These and other objects and advantages of the present invention will no doubt become apparent upon a reading of the following descriptions and a study of the several figures of the drawing.

BRIEF DESCRIPTION OF THE DRAWING

FIGS. 4A and 4B are used to illustrate the functioning of the device.

FIG. 5 is a schematic of the circuitry of the present invention.

FIG. 6 illustrates the present device attached between a camera and a tripod.

FIG. 7 illustrates the use of the device at a remote location.

DETAILED DESCRIPTION OF THE PREFERRED EMBODIMENT(S)

Figure 1:
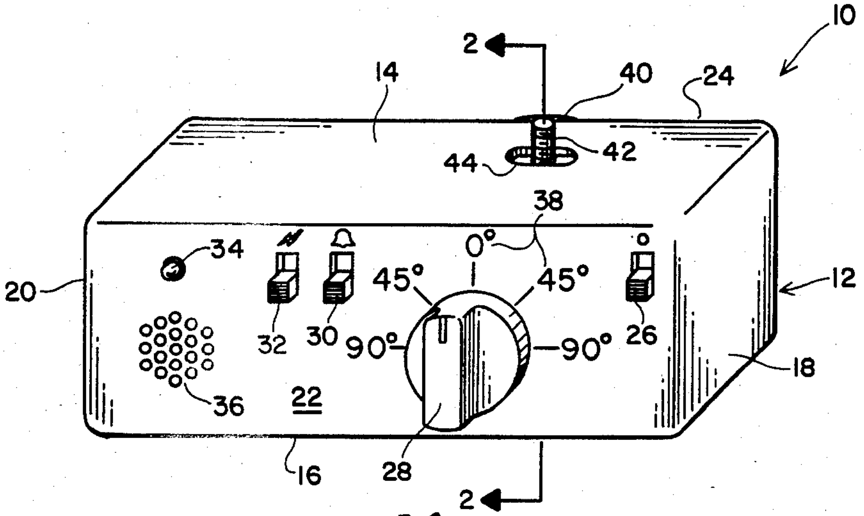
FIG. 1 is a perspective view of an electronic level device in accordance with the present invention.

Referring to FIG. 1, an electronic level device 10 in accordance with the present invention includes a rectangular, box shaped enclosure 12 having a top wall 14, a bottom wall 16 opposing top wall 14, a right side wall 18, a left side wall 20 opposing the right side wall, a front wall 22, and a back wall 24 opposing front wall 22. Enclosure 12 is provided with an internal chamber which houses the various active components of the present invention.

Front wall 22 is provided with an on/off switch 26, an angle selector knob 28, an alarm activating switch 30, a transmitter activating switch 32, an indicator light 34, and a plurality of holes 36 associated with the audible alarm. Indicia 38 is silk screened or otherwise provided on front wall 22 to provide a calibration in degrees for knob 28.

Also seen in FIG. 1 is a camera mount including a thumb wheel 40, a threaded stud 42 attached to the center of thumb wheel 40, and an elongated slot 44 within which stud 42 can slide. Enclosure 12 is also provided with a tripod mount on bottom wall 16 (not seen in this figure).

Figure 2:
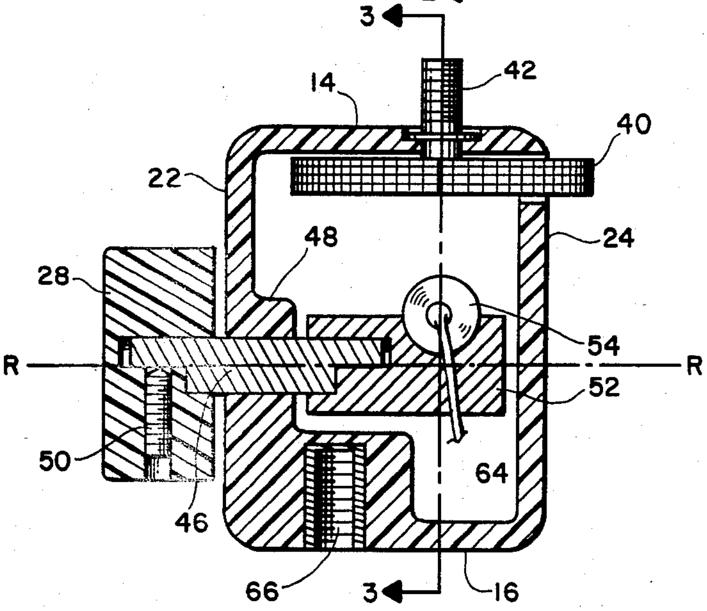
FIG. 2 is a cross-sectional view taken along line 2—2 of FIG. 1.

Referring now to the cross-sectional view of FIG. 2, a rotary knob shaft 46 is shown to extend through an island portion 48 of the inner surface of front wall 22. A set screw 50 is provided in knob 28 so that shaft 46 and knob 28 rotate together. Attached to the other end of shaft 46 is a support shaft 52 which rotates with knob 28 and knob shaft 46.

Figure 3:
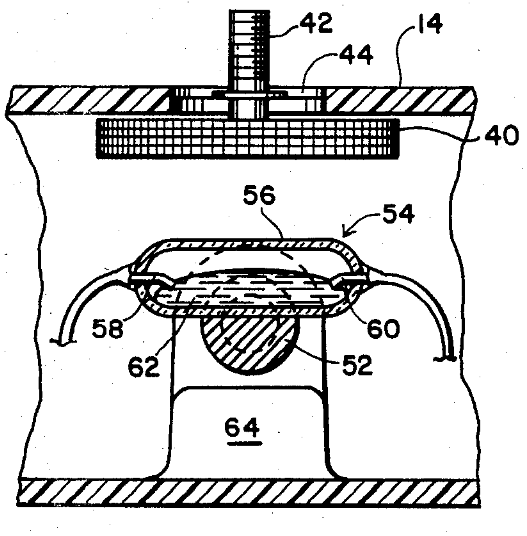
FIG. 3 is a cross-sectional view taken along line 3—3 of FIG. 2.

Referring now to FIGS. 2 and 3, a mercury switch 54 is provided including a glass envelope 56, a pair of leads 58 and 60, and liquid mercury 62. As will be discussed in greater detail subsequently, mercury switch 54 has a tilt axis which perpendicular to the axis of rotation of support shaft 52. When mercury switch 54 is in gravitationally normal position (i.e. its tilt axis is perpendicular to the line of gravity) the liquid mercury 62 couples leads 58 and 60 to close the switch. When the mercury switch 54 moves from its gravitationally normal position by more than a predetermined amount the liquid mercury will flow to one end of the envelope or the other causing the switch to open.

Also seen in FIGS. 2 and 3 is an island 64 on the inner surface of bottom wall 16 that is provided with a threaded bore hole 66. Threaded bore hole 66 serves as a tripod mount.

Referring now to the simplified view of FIG. 4A, mercury switch 54 is shown at its zero degree setting. At this setting, the tilt axis "T" of mercury switch 54 is parallel to bottom wall 16 and top wall 14 and is, of course, perpendicular to the axis of rotation "R" of support shaft 52. If, while in this setting, the enclosure 12 is shifted from its level position, the mercury 62 within switch 54 will no longer couple lead 58 to lead 60 and the switch will open.

Referring now FIG. 4B, the mercury switch 54 is now positioned at its 45° setting relative the reference surface of bottom wall 16. In this setting the mercury 62 within switch 54 will couple lead 58 to lead 60 only when the entire enclosure 12 is angled at 45°. If the enclosure 12 assumes any other orientation, the mercury 62 will flow to one end or the other of envelope 56 to open the switch. Thus, it can be seen that switch 54 can be set via knob 28 to close at any angular position between 0° and ±90°. Other angles can be attained by using other surfaces of enclosure 12 as the reference surface. If the angular orientation of enclosure 12 varies more than a predetermined amount from the angular setting, the mercury switch 54 will open. This predetermined deviation can be set by varying the amount of mercury 62 within the envelope, by varying the configuration of the envelope 56, or by other methods.

Referring now to FIG. 5, the circuit 68 of the present invention is shown to further include a battery 70, a diode 72, an NPN transistor 74, a biasing resistor 76, a current limiting resistor 78, a buzzer 80, and a transmitter 82 having an antenna 84.

When off/on switch 26 is closed, power is applied to line 86, diode 72, and line 88. The person using the device can then selectively activate buzzer 80 with switch 30 and/or transmitter 82 with switch 32.

When mercury switch 54 is open, biasing resistor 76 reverses biases transistor 74 to prevent it from conducting. When switch 54 closes, transistor 74 is forward biased and current "I" can flow through transistor 74 to ground. Thus, whcn switch 54 closes LED 34 will illuminate, and buzzer 80 and/or transistor 82 will be activated.

Referring now to FIG. 6, the enclosure 12 of the electronic leveling device 10 is shown attached between a camera 90 and a tripod 92. Referring back briefly to FIGS. 1-3, the device 10 is attached to camera 90 by rotating thumb wheel 40 to cause threaded stud 42 to engage a threaded bore in the camera body. Slot 44 allows the threaded stud 42 to be laterally adjusted so that the device 10 can be used with a number of cameras. Similarly, threaded bore 66 of enclosure 12 is engaged with a threaded stud of tripod 92.

When used as a camera leveler, device 10 can be attached between the camera and the tripod as shown, or can be used with the camera alone. For example, if a photographer wants to take a perfectly level picture he will set knob 28 to the zero degree position, activate on/off switch 26, and alarm switch 30. The photographer can then look through the camera 90 view finder until he hears an audible alarm at which time he can take the picture. Similarly, if the photographer wishes to take a picture at a 45° angle, he can set knob 28 to the 45° position and tilt the camera until the buzzer 80 sounds at which time he can take the picture.

The device 10 can also be used to indicate levels in remote locations such as on a rooftop of a building. As shown in FIG. 7, the device 10 is attached to the sagging ridge of a roof 92 of a building 94. A person within the attic of building 94 can then use a jack to raise the ridge of roof 92 until he receives a radio signal from device 10 indicating that the roof is level.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. An electronic level device comprising:

a substantially rectangular, box shaped enclosure having a top wall, a bottom wall, a front wall, a back wall, and two side walls; said top wall being provided with a camera mount and said bottom wall being provided with a tripod mount; said camera mount including a threaded stud extending through an elongated slot provided in said top wall, a thumb wheel attached to said threaded stud, and means for retaining said stud within said slot such that it may slide the length of said slot, said back wall being provided with another slot through which a portion of said thumb wheel protrudes;

a rotary shaft extending through a front wall of said enclosure, said rotary shaft having an axis of rotation substantially parallel to a top and a bottom wall of said enclosure;

a knob attached to an end of said rotary shaft, and wherein said enclosure is provided with indicia on said front wall proximate said knob to indicate degrees of tilt, said knob being capable of rotation of at least 180°;

an elongated mercury switch disposed within said enclosure and attached to said shaft, said mercury switch including a sealed, insulative body enclosing a quantity of mercury and two, separated conductive electrodes which can be shorted by said quantity of mercury to close said switch, said switch being closed when it is substantially parallel to said top and bottom walls of said enclosure; and audible alarm means activated by the closure of said switch, said audible alarm means including an audible transducer having a pair of inputs, one of which is coupled to a power supply through on/off switch means, and the other of which is coupled to a grounding transistor which is forward biased when said switch is closed and reverse biased when said switch is open.

2. An electronic level device as recited in claim 1 further including visual alarm means activated by the closure of said switch, said visual alarm means including a light having a pair of inputs, one of which is coupled to said power supply through said on/off switch means, and the other of which is coupled to said grounding transistor.

3. An electronic level device as recited in claim 1 further comprising a transmitter activated by the closure of said switch, said transmitter including a pair of inputs, one of which is coupled to said power supply through said on/off switch means, and the other of which is coupled to said grounding transistor.

* * * * *